United States Patent
Zhou et al.

(10) Patent No.: US 9,631,154 B2
(45) Date of Patent: Apr. 25, 2017

(54) METHOD AND APPARATUS FOR REMOVING HIGH CONCENTRATION ACID GAS FROM NATURAL GAS

(71) Applicants: Shaojun Zhou, Palatine, IL (US); Howard S. Meyer, Hoffman Estates, IL (US)

(72) Inventors: Shaojun Zhou, Palatine, IL (US); Howard S. Meyer, Hoffman Estates, IL (US)

(73) Assignee: Gas Technology Institute, Des Plaines, IL (US)

(*) Notice: Subject to any disclaimer, the term of this patent is extended or adjusted under 35 U.S.C. 154(b) by 191 days.

(21) Appl. No.: 14/277,255

(22) Filed: May 14, 2014

(65) Prior Publication Data
US 2015/0328583 A1  Nov. 19, 2015

(51) Int. Cl.
*B01D 53/14* (2006.01)
*B01D 53/22* (2006.01)
(Continued)

(52) U.S. Cl.
CPC .......... *C10L 3/102* (2013.01); *B01D 53/1443* (2013.01); *B01D 53/22* (2013.01); *B01D 53/226* (2013.01); *B01D 53/228* (2013.01); *B01D 71/06* (2013.01); *B01D 71/16* (2013.01); *B01D 71/32* (2013.01); *B01D 71/34* (2013.01); *B01D 71/50* (2013.01); *B01D 71/56* (2013.01); *B01D 71/64* (2013.01); *B01D 71/68* (2013.01); *C10L 3/10* (2013.01); *C10L 3/103* (2013.01); *C10L 3/104* (2013.01); *B01D 2256/245* (2013.01); *B01D 2257/302* (2013.01); *B01D 2257/304* (2013.01); *B01D 2257/408* (2013.01);
(Continued)

(58) Field of Classification Search
None
See application file for complete search history.

(56) References Cited

U.S. PATENT DOCUMENTS

| 5,100,555 A | 3/1992 | Matson |
| 2008/0142441 A1 | 6/2008 | Pashley |

(Continued)

OTHER PUBLICATIONS

"Gas/liquid membrane contactor based on disubstituted polyacetelyne for CO2 absorption liquid regeneration at high pressure and temperature" Trusov et al. Sep. 2, 2011, Journal of Membrane Science, p. 242.*

(Continued)

*Primary Examiner* — Duane Smith
*Assistant Examiner* — Cabrena Holecek
(74) *Attorney, Agent, or Firm* — Pauley Erickson & Kottis

(57) ABSTRACT

A multi-stage process for recovering acid gas from natural gas having high acid gas contents utilizes two or more membrane absorption contactors arranged in series. The first membrane absorption contactor uses a physical solvent to remove a high volume of acid gas transferred across a membrane, and to reduce the acid gas content in the natural gas to a lower level that can be managed using chemical solvents. The second and, if needed, subsequent membrane absorption contactors can use a chemical solvent to remove acid gas transferred across the respective membranes and reduce the acid gas content in the natural gas to very low levels, if needed, depending on product specifications.

16 Claims, 2 Drawing Sheets

(51) Int. Cl.
*C10L 3/10* (2006.01)
*B01D 71/06* (2006.01)
*B01D 71/16* (2006.01)
*B01D 71/32* (2006.01)
*B01D 71/34* (2006.01)
*B01D 71/50* (2006.01)
*B01D 71/56* (2006.01)
*B01D 71/64* (2006.01)
*B01D 71/68* (2006.01)

(52) U.S. Cl.
CPC .. *B01D 2257/504* (2013.01); *B01D 2317/025* (2013.01); *C10L 2290/548* (2013.01); *Y02C 10/10* (2013.01)

(56) References Cited

U.S. PATENT DOCUMENTS

| | | | |
|---|---|---|---|
| 2011/0223650 A1* | 9/2011 | Saunders | B01D 53/1475 435/266 |
| 2014/0090556 A1* | 4/2014 | Shah | B01D 53/1406 95/45 |
| 2015/0251134 A1* | 9/2015 | Acikgoz | B01D 53/52 423/220 |

OTHER PUBLICATIONS

Khaisri, S. et al., "CO2 Stripping From Monoethanolamine Using a Membrane Contactor", Jnl of Membrane Science, Jul. 2011, v. 376, pp. 110-118.

Kumazawa, H., "Absorption and Desportion of CO2 by Aqueous Solutions of Sterically Hindered 2-Amino-2-Methyl-1-Propanol in Hydrophobic Microporous Hollow Fiber Contained Contactors", Chem. Eng. Communications, 2000, v. 184:1, pp. 163-179.

Trusov, A. et al., "Gas/Liquid Membrane Contactors Based on Disubstituted Poly Acetylene for CO2 Absorption Liquid Regeneration at High Pressure and Temperature", Jnl of Membrane Science, Nov. 2011, v. 383, pp. 241-249.

Brunetti, A., et al., "Membrane Technologies for CO2 Separation", Jnl of Membrane Science, 2010, v. 359, pp. 115-125.

Dept of Energy, "Efficient Regeneration of Physical and Chemical Solvents for CO2 Capture", http://www.netl.doe.gov/File%20Library/research/coal/carbon-storage/infrastructure/FE0002196.pdf, May 2010.

Dindore, V.Y., "Gas Purification Using Membrane Gas Absorption Processes", Thesis, Universiteit Twente, Netherlands, Nov. 19, 2003.

Dortmundt, D., et al., "Recent Developments in CO2 Removal Membrane Technology", UOP, LLC, 1999, Des Plaines, Illinois.

Hoff, K.A., "Modeling and Experimental Study of Carbon Dioxide Absorption in a Membrane Contactor", Thesis, Norwegian University of Science and Technology; Dept. of Chem. Eng., Mar. 2003.

Hussain, A., et al., "A feasibility study of CO2 capture from flue gas by a facilitated transport membrane", Jnl of Membrane Science, 2010, v. 359, pp. 140-148.

Keshavarz, P., et al., "Analysis of CO2 separation and simulation of a partially wetted hollow fiber membrane contactor", Jnl of Hazardous Materials, 2008, v.152, pp. 1237-1247.

Kovvali, A.S., et al., "Immobilized Liquid Membranes for CO2 Separation", http://web.anl.gov/PCS/acsfuel/preprint%20archive/Files/45_4_WASHINGTON%20DC_08-00_0665.pdf.

Meinema, H.A., et al., "Ceramic Membranes for Gas Separation-Recent Developments and State of the Art", Interceram, 2005, v. 54, pp. 86-91.

Reed, B.W. et al, "Membrane Separations Technology: Principles and Applications Chapter 10: Membrane Contactors", Elsevier Science B.V., 1995, p. 478.

* cited by examiner

METHOD AND APPARATUS FOR REMOVING HIGH CONCENTRATION ACID GAS FROM NATURAL GAS

FIELD OF THE INVENTION

This invention is directed to a multi-stage method and apparatus for removing an acid gas present in high concentrations in natural gas.

BACKGROUND OF THE INVENTION

Untreated natural gas can contain high concentrations, even majority concentrations of up to 80% by volume of acid gas. The acid gas is composed mainly or entirely of carbon dioxide, but can also include hydrogen sulfide, sulfur dioxide, carbon disulfide, hydrogen cyanide and carbonyl sulfide. Such high amounts of carbon dioxide and lesser amounts of other acid gases are unsuitable and unsafe for natural gas used in residential and industrial applications.

Processes for removing acid gases from natural gas typically include membrane separators in which the natural gas is fed to one side of a membrane separator and the acid gas component is caused to diffuse through the membrane, separating it from the natural gas. These processes have drawbacks when the acid gas is present at high concentrations, due to the large size of the membrane separator required for effective treatment. Also, high concentrations of acid gas such as carbon dioxide can plasticize the polymeric separator membranes and reduce their separation efficiency. Also, these processes cannot achieve high removal effectiveness to achieve product gas quality in many cases.

There is a need or desire for a method and apparatus for removing high concentration acid gases from natural gas, which addresses the foregoing size, quality, and durability issues.

SUMMARY OF THE INVENTION

The present invention is directed to a multi-stage method and apparatus for removing an acid gas present in high concentrations in natural gas. The invention combines the advantages of physical solvents and chemical solvents in different stages of membrane separation to provide a solution that is cost-effective and durable. A physical solvent is employed in a first stage to reduce the concentration of acid gas from a first high level to a second lower level that can be more easily managed using a chemical solvent without requiring excessive size and expense. A chemical solvent is employed in second and, if needed, subsequent stages to reduce the concentration of acid gas to still lower levels that meet product specifications.

The method includes the steps of supplying natural gas having a first concentration of acid gas to a first side of a first membrane, and supplying a physical solvent to a second side of the first membrane, suitably in a first membrane absorption contactor. Acid gas is selectively transferred from the natural gas through the first membrane from the first side to the second side, yielding natural gas having a second (lower) concentration of acid gas on the first side of the first membrane. The natural gas having the second concentration of acid gas is then supplied to the first side of a second membrane, suitably in a second membrane absorption contactor, and a chemical solvent is supplied to the second side of the second membrane. Acid gas is selectively transferred from the natural gas through the second membrane, from the first side to the second side of the second membrane, yielding natural gas having a third (lower) concentration of acid gas on the first side of the second membrane. The natural gas having the third concentration of acid gas is then recovered from the first side of the second membrane. The process can be continued in subsequent stages, as needed, until the natural gas reaches or falls below a specified concentration of acid gas.

With the foregoing in mind, it is a feature and advantage of the invention to provide a method and corresponding apparatus that reduces high concentrations of acid gas in natural gas to product specification levels, without incurring expensive solvent and equipment costs, space requirements, or process durability issues. These and other features and advantages will become further apparent from the following detailed description of the invention read in conjunction with the drawings.

DETAILED DESCRIPTION OF THE INVENTION

Figure 1:
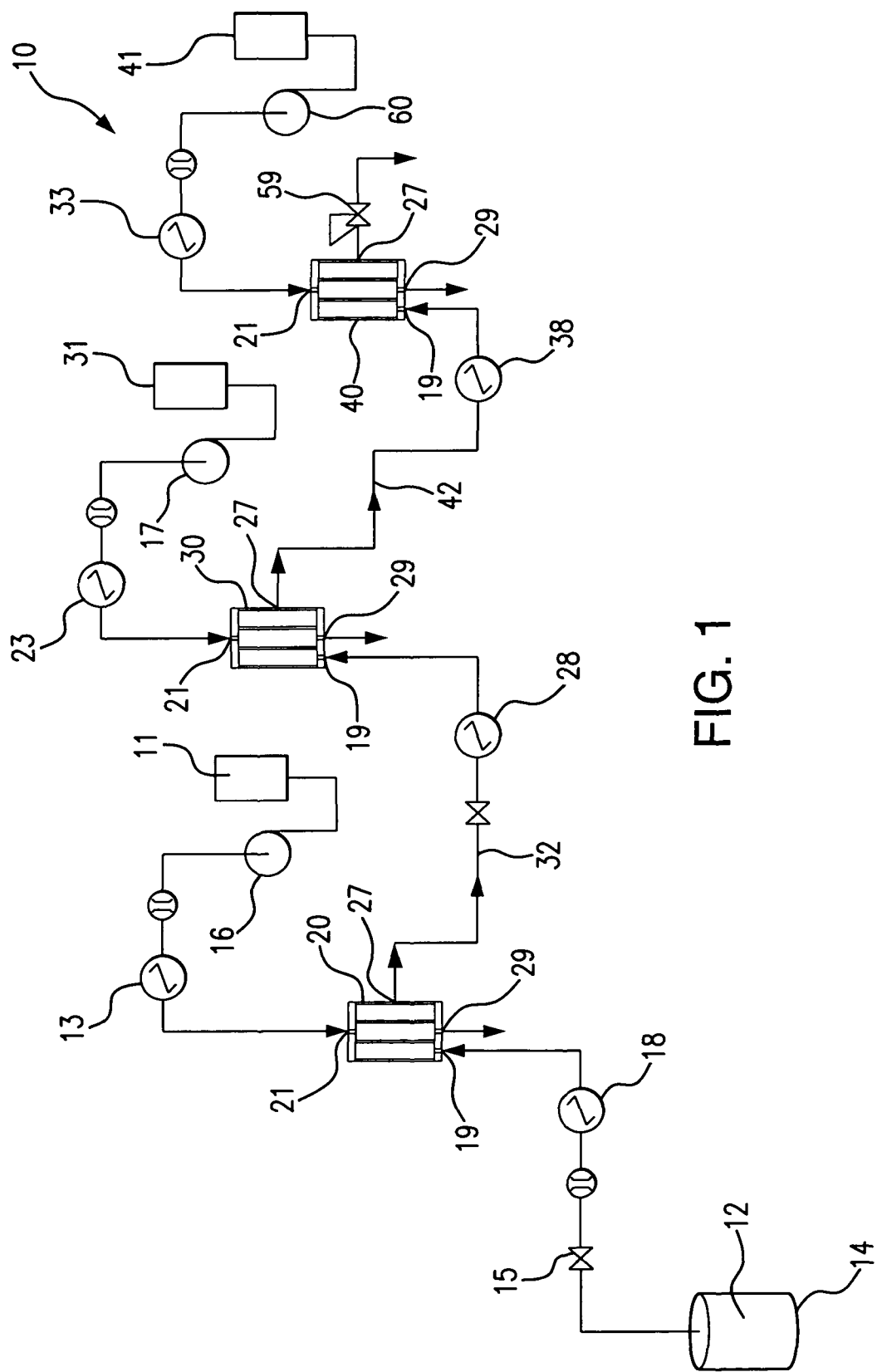
FIG. 1 schematically illustrates a multi-stage process of the invention, shown as including three stages, for removing acid gas from natural gas.
Figure 2:
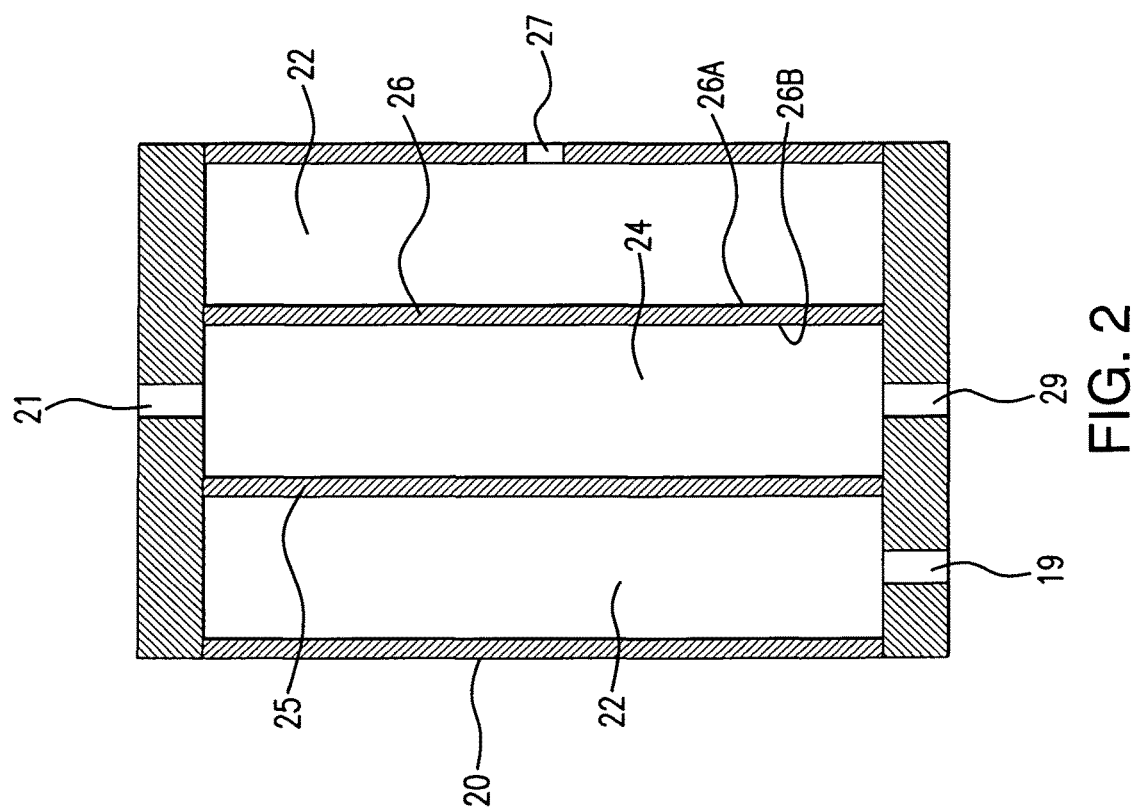
FIG. 2 is a cutaway view of a membrane absorption contactor 20 shown in FIG. 1, and is also representative of membrane absorption contactors 30 and 40 shown in FIG. 1.

Referring to FIGS. 1 and 2, a multi-stage process 10 for removing acid gas from natural gas is illustrated. Acid gases found in natural gas include, for example, carbon dioxide, hydrogen sulfide, sulfur dioxide, carbon disulfide, hydrogen cyanide and carbonyl sulfate. Acid gases, particularly carbon dioxide, can be present at up to 80% by volume of natural gas extracted from geological sources. The process 10 is designed to reduce the acid contents to commercially acceptable product levels (typically below 2% by volume for pipeline gas or below 50 ppmv for LNG specification gas), and is especially suitable for natural gas having initial acid gas concentrations of at least about 20% by volume, or at least about 35% by volume, or at least about 50% by volume, and up to about 80% by volume. The multi-stage process 10 is designed to reduce the acid gas concentration in the natural gas to not more than about 10% by volume in its first stage, not more than about 2% by volume in its second stage, and not more than about 0.1% by volume, suitably not more than about 50 ppm by volume in its third and/or final stage. While these limits apply to all acid gases combined, carbon dioxide is typically the primary acid gas component. In situations where the acid gas includes hydrogen sulfide in addition to carbon dioxide, the multi-stage process 10 is also designed to reduce the hydrogen sulfide content in the natural gas to not more than about 4 ppmv in the second stage or, if needed, in the third and/or final stage.

Natural gas 12 having a first (high) concentration of acid gas is fed from a source 14 which can be a natural gas well or pipeline leading from a point of origin. The supply pressure and flow rate of the natural gas 12 can be regulated by valve 15. If necessary, the natural gas 12 can be cooled using cooler 18. The natural gas 12 is then supplied to an inlet 19 of a first stage membrane absorption contactor 20.

The first stage membrane absorption contactor 20 can include a shell side 22 and a bore side 24 separated by a membrane 26 as shown in FIG. 2. The membrane 26 can be disposed in any suitable manner that permits the diffusion of acid gas through the membrane yet blocks the flow of natural gas. In the embodiment shown in FIG. 2, the membrane 26 surrounds a bore side 24 which can be defined by a rigid porous support plate or screen, or any suitable porous material shown at 25. Membrane 26 is suitably a non-porous material that selectively diffuses the acid gas from the first side 26A to the second side 26B of the membrane, thus transferring the acid gas from the shell side 22 to the bore side 24 of the membrane absorption contactor 20 while maintaining the natural gas on the first side 26A of the membrane and the shell side 22 of the membrane absorption contactor. Alternatively, the membrane 26 can be a microporous hydrophobic material with pores small enough to selectively permit the transfer of acid gas from natural gas into the physical or chemical solvent but not the transfer of solvent into the natural gas.

Non-porous membranes are films made of polymers having amorphous segments that selectively allow acid gases to pass through by a solution diffusion mechanism. The selectivity and transfer rate of non-porous membranes are significantly affected by temperature. Suitable non-porous membrane polymers include without limitation polyvinylidene fluoride, polypropylene, cellulose acetate, polysulfone, polycarbonate, polyimide, polyamide, etc., and combinations thereof.

Microporous hydrophobic membranes have voids connected by pores whose diameters are large enough to facilitate the transfer of acid gases but small enough to block the transfer of solvent into natural gas. Suitable microporous membrane polymers include without limitation polypropylene, polyethylene, polyperfluoroalkoxy, polyetheretherketone, polytetrafluoroethylene, polyvinylidene fluoride, etc., and combinations thereof.

A physical solvent is supplied to the second side 26B of the membrane 26 through an inlet 21 that passes into the bore side 24 of first stage membrane absorption contactor 20. The physical solvent originates from source 11, which can be a storage tank, and can be pumped using pump 16 and warmed or cooled using heat exchanger 13. A physical solvent is a solvent that relies on physical solubility, as opposed to chemical reaction, to dissolve the acid gases. Suitable physical solvents include without limitation dimethyl ethers of polyethylene glycol, methanol, N-methyl-2-pyrrolidone, propylene carbonate, water, diethylene glycol, silicone fluid, aliphatic and aromatic hydrocarbons, alcohols, ketones, aldehydes, N-formyl morpholine, N-acetyl morpholine, etc., and combinations thereof. Because solubility decreases with increasing temperature, it is generally advantageous to cool the physical solvent using heat exchanger 13.

As the acid gas from the natural gas 12 is transferred from the first side 26A to the second side 26B of membrane 26, it dissolves in the physical solvent and is transported (along with the physical solvent) through outlet 29 of membrane absorption contactor 20. The selective transfer of acid gas through the membrane 26 yields natural gas having a second (lower) concentration of acid gas on the first side 26A of the membrane 26, the second concentration typically being not more than about 10% by volume. After the physical solvent exits the membrane absorption contactor 20 through bore side outlet 29, it can be heated to reduce the solubility of the acid gas and cause substantial separation, flashed at a lower pressure to release the acid gas and cause substantial separation, or heated and flashed to release acid gas. The physical solvent can then be recycled for further use in the membrane absorption contactor 20.

Alternatively, the acid gas containing natural gas can be fed to the bore side 21 of the membrane absorption contactor 20 and the solvent fed to the shell side 19 of the membrane absorption contactor 20. The sweet natural gas can then be recovered from the bore side outlet 29 and the acid gas laden solvent recovered from the shell side outlet 27.

The natural gas having the second concentration of acid gas exits membrane absorption contactor 20 via shell side outlet 27 and is supplied via transfer line 32 and heat exchanger 28 (if needed) to the shell side inlet 19 of the second stage membrane absorption contactor 30. The second membrane absorption contactor 30 can be configured in the same or similar fashion as the first membrane absorption contactor 20 and is therefore described with like reference numerals as shown in FIG. 2. The second membrane absorption contactor 30 includes a shell side 22, a bore side 24, a second membrane 26 having a first side 26A and a second side 26B and supported by a porous support or screen 25, a shell side inlet 19 and outlet 27, and a bore side inlet 23 and outlet 29.

The natural gas having the second concentration of acid gas is supplied to the first side 26A of the second membrane 26. A chemical solvent from source 31, which can be a holding tank, is supplied via pump 17 and heat exchanger 23 and bore side inlet 21 to the second side 26B of the second membrane. A chemical solvent is one that chemically reacts with the acid gas to effect dissolution. Suitable chemical solvents include without limitation aqueous ethanolamine solutions, aqueous potassium, sodium, or ammonium carbonate solutions, other alkaline salt solutions, ionic liquids, ammonia, aqueous diglycolamine solutions, triazine solutions etc., and combinations thereof.

The second stage membrane 26 may be non-porous or micro-porous as described above. Acid gas present in the natural gas having the second concentration is transferred through the second membrane 26, from the first side 26A to the second side 26B, yielding natural gas having a third (lower) concentration of acid gas on the first side 26A of second membrane 26. The third concentration of acid gas is typically not more than about 2% by volume, which is a common pipeline specification for natural gas. The natural gas having the third concentration of acid gas is recovered from the shell side outlet 27 of second stage membrane absorption contactor 30. The chemical solvent exits through bore side outlet 29 and can be separated from the acid gas and recycled using conventional methods of heating and stripping.

Because the first and second stage membrane absorption contactors 20 and 30 rely on the transfer of acid gas from the first side 26A to the second side 26B of a corresponding membrane 26, it may be advantageous to provide a pressure differential across the membrane to facilitate such transfer. While the natural gas 12 provided from the source 14 may have a very high initial pressure of up to about 80 atmospheres, or up to 100 atmospheres or more, the pressure differential across the membranes 26 should not be so high as to damage the membranes 26. The membrane absorption contactors 20 and 30 can operate without a pressure differential if it is advantageous to operate the membrane absorption contactors in such a manner.

The natural gas having the third concentration is then carried via transfer line 42 and heat exchanger 38 (if needed) to the third stage membrane absorption contactor 40 which can be configured in the same or similar fashion as the first and second stage membrane absorption contactors 20 and 30 and can be described using the same reference numerals as in FIG. 2. The natural gas having the third concentration of acid gas is supplied via shell side inlet 19 to the first side 26A of third membrane 26 in third stage membrane absorption contactor 40, suitably under modest pressure as described above. A chemical solvent, which can be the same or different chemical solvent used in the second membrane absorption contactor 30, is supplied from a source 41 via pump 60 and heat exchanger 33 (if needed) and through the bore side inlet 21, to the second side 26B of third membrane 26.

Acid gas from the natural gas having the third concentration is transferred through the third membrane 26, from the first side 26A to the second side 26B of the third membrane 26, yielding natural gas having a fourth (lower) concentration of acid gas on the first side 26A of third membrane 26. The fourth concentration can be low enough to meet specifications for liquid natural gas and is suitably not more than about 50 ppm by volume. The natural gas having the fourth concentration of acid gas can then be recovered from the first side 26A of third membrane 26 via the outlet 27 and flow regulator 59. The chemical solvent can be recovered from the third membrane absorption contactor 40 via outlet 29, and can be separated from the acid gas using known techniques and recycled.

While the invention is described in three membrane absorption contactor stages, the invention can be practiced using two, four or more membrane absorption contactor stages depending on the amounts and types of acids present in the incoming natural gas and the specifications for the product natural gas, as well as the natural gas flow rates and other process conditions. The invention saves money and space by combining the cost advantages of physical solvents with the performance advantages of chemical solvents to absorb acid gases through the respective membranes 26 and take the acid gas concentrations in natural gas from very high to very low levels.

The embodiments of the invention described herein are presently preferred. Various modifications and improvements can be made without departing from the spirit and scope of the invention. The scope of the invention is defined by the appended claims and includes all changes that fall within the meaning and range of equivalents.

We claim:

1. A method of removing acid gas from natural gas, comprising the steps of:
   supplying natural gas having a first concentration of acid gas to a first side of a first membrane;
   supplying a physical solvent to a second side of the first membrane;
   transferring acid gas from the natural gas through the first membrane from the first side to the second side, yielding natural gas having a second concentration of acid gas on the first side of the first membrane, the second concentration being lower than the first concentration;
   supplying the natural gas having the second concentration of acid gas to a first side of a second membrane;
   supplying a chemical solvent to a second side of the second membrane;
   transferring acid gas from the natural gas having the second concentration through the second membrane, from the first side to the second side of the second membrane, yielding natural gas having a third concentration of acid gas on the first side of the second membrane, the third concentration being lower than the second concentration; and
   recovering the natural gas having the third concentration of acid gas from the first side of the second membrane.

2. The method of claim 1, further comprising the steps of:
   supplying the natural gas having the third concentration of acid gas to a first side of a third membrane;
   supplying a chemical solvent to a second side of the third membrane;
   transferring acid gas from the natural gas having the third concentration through the third membrane, from the first side to the second side of the third membrane, yielding natural gas having a fourth concentration of acid gas on the first side of the third membrane, the fourth concentration being lower than the third concentration; and
   recovering the natural gas having the fourth concentration of acid gas from the second side of the third membrane.

3. The method of claim 1, wherein the first membrane comprises a microporous material selected from the group consisting of polypropylene, polyethylene, polyperfluoroalkoxy, polyetheretherketone, polytetrafluoroethylene, polyvinylidene fluoride, and combinations thereof.

4. The method of claim 1, wherein the first membrane comprises a non-porous material selected from the group consisting of polyvinylidene fluoride, polypropylene, cellulose acetate, polysulfone, polycarbonate, polyimide, polyamide, and combinations thereof.

5. The method of claim 1, wherein the second membrane comprises a non-porous material selected from the group consisting of polyvinylidene fluoride, polypropylene, cellulose acetate, polysulfone, polycarbonate, polyimide, polyamide, and combinations thereof.

6. The method of claim 1, wherein the physical solvent is selected from the group consisting of dimethyl ethers of polyethylene glycol, methanol, N-methyl-2-pyrrolidone, propylene carbonate, water, diethylene glycol, silicone fluid, aliphatic and aromatic hydrocarbons, alcohols, ketones, aldehydes, N-formyl morpholine, N-acetyl morpholine, and combinations thereof.

7. The method of claim 1, wherein the chemical solvent is selected from the group consisting of aqueous ethanolamine solutions, aqueous potassium, sodium, or ammonium carbonate solutions, other alkaline salt solutions, ionic liquids, ammonia, aqueous diglycolamine solutions, triazine solutions, and combinations thereof.

8. The method of claim 1, further comprising the step of applying a pressure on the first side of the first membrane, creating a pressure drop between the first and second sides of the first membrane.

9. The method of claim 1, further comprising the step of applying a pressure on the first side of the second membrane, creating a pressure drop between the first and second sides of the second membrane.

10. A method of removing acid gas from natural gas, comprising the steps of:
    supplying natural gas having a first concentration of acid gas of at least about 20% by volume to a first side of a first membrane;
    supplying a physical solvent to a second side of the first membrane;
    transferring acid gas from the natural gas from the first side to the second side of the first membrane, yielding natural gas having a second concentration of acid gas of not more than about 10% by volume on the first side of the first membrane;
    supplying the natural gas having the second concentration of acid gas to a first side of the second membrane;
    supplying a chemical solvent to a second side of the second membrane;
    transferring acid gas from the natural gas having the second concentration from the first side to the second side of the second membrane, yielding natural gas having a third concentration of acid gas of not more than about 2% by volume on the first side of the second membrane; and recovering the natural gas having the third concentration of acid gas from the first side of the second membrane.

11. The method of claim 10, further comprising the steps of:

supplying the natural gas having the third concentration of acid gas to a first side of a third membrane;

supplying a chemical solvent to a second side of the third membrane;

transferring acid gas from the natural gas having the third concentration through the third membrane, from the first side to the second side of the third membrane, yielding natural gas having a fourth concentration of acid gas on the first side of the third membrane, the fourth concentration being not more than about 0.1% by volume; and recovering the natural gas having the fourth concentration of acid gas from the second side of the third membrane.

12. The method of claim 10, wherein the first concentration is at least about 35% by volume.

13. The method of claim 10, wherein the first concentration is at least about 50% by volume.

14. The method of claim 11, wherein the fourth concentration is not more than about 50 ppm by volume.

15. The method of claim 10, wherein the solvent supplied to the second side of the second membrane comprises a chemical solvent.

16. The method of claim 10, further comprising the steps of applying pressure differentials across each of the first and second membranes.

* * * * *